United States Patent
Nagaoka et al.

(10) Patent No.: US 8,671,661 B2
(45) Date of Patent: Mar. 18, 2014

(54) EXHAUST GAS PURIFICATION METHOD AND EXHAUST GAS PURIFICATION SYSTEM

(75) Inventors: Daiji Nagaoka, Fujisawa (JP); Teruo Nakada, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 376 days.

(21) Appl. No.: 12/736,676

(22) PCT Filed: Apr. 15, 2009

(86) PCT No.: PCT/JP2009/057557
§ 371 (c)(1),
(2), (4) Date: Oct. 29, 2010

(87) PCT Pub. No.: WO2009/133771
PCT Pub. Date: Nov. 5, 2009

(65) Prior Publication Data
US 2011/0041479 A1 Feb. 24, 2011

(30) Foreign Application Priority Data
Apr. 30, 2008 (JP) .................. 2008-119113

(51) Int. Cl.
*F01N 3/00* (2006.01)
*F01N 3/10* (2006.01)

(52) U.S. Cl.
USPC .................. 60/285; 60/274; 60/286; 60/297; 60/301; 60/303

(58) Field of Classification Search
USPC .......... 60/274, 285, 286, 297, 299, 301, 303, 60/311
See application file for complete search history.

(56) References Cited

U.S. PATENT DOCUMENTS

2003/0136113 A1* 7/2003 Nakagawa et al. ............. 60/285
2006/0008397 A1 1/2006 Bruck

FOREIGN PATENT DOCUMENTS

| DE | 2007 010 435 | 11/2007 | |
|---|---|---|---|
| EP | 894950 A2 * | 2/1999 | ................ F01N 3/02 |
| JP | 8-270439 | 10/1996 | |
| JP | 2000-257417 | 9/2000 | |
| JP | 3412491 | 3/2003 | |
| JP | 2003-138930 | 5/2003 | |

(Continued)

OTHER PUBLICATIONS

Patent Abstracts of Japan, Publication No. 11-210446, Published Aug. 3, 1999.

(Continued)

*Primary Examiner* — Audrey K Bradley
(74) *Attorney, Agent, or Firm* — Staas & Halsey LLP

(57) ABSTRACT

An exhaust gas purification method, and system. In order from an upstream side of an engine exhaust passage there are provided, a NOx occlusion-reduction catalyst, a hydrocarbon ("HC") adsorbing member, and a catalyzed diesel particulate filter or oxidation catalyst. During NOx regeneration control, an air-fuel ratio of exhaust gas in terms of excess air factor is taken to be 0.8 to 1.1 when an index temperature representative of the HC-adsorbing member is a first judgment temperature or less, is taken to be 1.0 to 1.1 when the index temperature is between a first judgment temperature and a second judgment temperature, and is taken to be 0.8 to 1.1 when the index temperature is the second judgment temperature or above, causing an outflow of HC to the atmosphere to be reduced.

4 Claims, 4 Drawing Sheets

(56) References Cited

FOREIGN PATENT DOCUMENTS

| JP | 2003-148139 | 5/2003 |
|----|-------------|--------|
| JP | 2003-206785 | 7/2003 |
| JP | 2004-092486 | 3/2004 |
| JP | 3536713 | 3/2004 |
| JP | 2005-155404 | 6/2005 |
| JP | 2006-22755 | 1/2006 |
| WO | WO03/025356 | 3/2003 |

OTHER PUBLICATIONS

Patent Abstracts of Japan, Publication No. 2000-257417, Published Sep. 19, 2000.
Patent Abstracts of Japan, Publication No. 08-270439, Published Oct. 15, 1996.
Patent Abstracts of Japan, Publication No. 2003-138930, Published May 14, 2003.
Patent Abstracts of Japan, Publication No. 2006-022755, Published Jan. 26, 2006.
International Search Report dated Aug. 4, 2009 in PCT/JP2009/057557.
Abstract of Japanese Pub. No. 2003-148139, Published May 21, 2003.
Abstract of Japanese Pub. No. 2004-092486, Published Mar. 25, 2004.
Abstract of Japanese Pub. No. 2003-206785, Published Jul. 25, 2003.
English Abstract of WO 2009/012819.
Apr. 8, 2013 Annex to European Search Report in corresponding European Application No. 09 77 0002.

* cited by examiner

EXHAUST GAS PURIFICATION METHOD AND EXHAUST GAS PURIFICATION SYSTEM

This application claims the benefit under U.S.C. Section 371, of PCT International Application No. PCT/JP2009/057557, filed Apr. 15, 2009 and Japanese Application No. 2008-119113 filed Apr. 30, 2008, the contents of which are incorporated herein by reference.

TECHNICAL FIELD

The present invention relates to an exhaust gas purification system having a NOx occlusion-reduction catalyst and one of a catalyzed diesel particulate filter ("DPF") and an oxidation catalyst, and more specifically to an exhaust gas purification method and an exhaust gas purification system with which an outflow of HC to the atmosphere can be greatly improved during exhaust gas air-fuel ratio rich control for regenerating the NOx occlusion-reduction catalyst.

BACKGROUND ART

Among NOx purification catalysts (DeNOx catalysts) used for purification of NOx in exhaust gas from diesel engines, in-cylinder gasoline direct injection engines (GDI), and the like, there is a NOx occlusion-reduction catalyst called a lean NOx trap (LNT). This catalyst is formed by supporting an occlusion material such as an alkali metal (for example, potassium K, or the like) or an alkaline earth metal (for example, barium Ba, or the like) together with a noble metal such as platinum Pt. In an air-fuel ratio lean state where the exhaust gas is oxygen-rich, the catalyst oxidizes NO in exhaust gas, and occludes NOx in the form of a nitrate salt of the occlusion material. Meanwhile, in an air-fuel ratio rich state where the exhaust gas contains almost no oxygen, the catalyst releases the occluded NOx, and reduces the released NOx with a reducing agent such as HC or CO by way of a three-way catalyst function. By way of these functions, the catalyst reduces the amount of NOx in exhaust gas.

To restore the NOx occlusion capacity of the NOx occlusion-reduction catalyst, NOx regeneration control is conducted. In the NOx regeneration control, when the air-fuel ratio of exhaust gas is brought into a rich state, a reducing agent such as hydrocarbon ("HC") is supplied to the NOx occlusion-reduction catalyst. The supply of the reducing agent is achieved by performing post-injection in which fuel is injected into a cylinder after main injection, or by performing in-exhaust pipe fuel direct injection in which fuel is injected directly into an exhaust pipe.

However, the supply of HC involves a problem that the HC may pollute the atmosphere. Specifically, when the HC is supplied too much to be consumed by the NOx occlusion-reduction catalyst, or when the temperature of the NOx occlusion-reduction catalyst is low, HC not used in the reduction of NOx outflows to the downstream side, and HC slip, which is the outflow of HC to the atmosphere, occurs.

As a countermeasure against this problem, the amount of the noble metal supported is increased, or ceria (cerium oxide) which functions as an oxygen occlusion material is used as an auxiliary catalyst, for strengthening the HC oxidation function of the NOx occlusion-reduction catalyst. However, the countermeasure is unsatisfactory as a countermeasure against the outflow of HC.

Meanwhile, an exhaust gas purification apparatus for an internal combustion engine configured as follows to prevent the emission of hydrocarbons to the atmosphere has been proposed as described in, for example, Japanese patent application Kokai publication No. 2000-257417. The exhaust gas purification apparatus is constituted of a NOx occlusion-reduction catalyst, an HC-adsorbing member capable of preferentially adsorbing heavy hydrocarbon in exhaust gas, and an oxidation catalyst which are disposed on an exhaust passage in this order from the upstream side. Here, when a reducing agent is supplied at low temperature, the HC-adsorbing member adsorbs heavy components of hydrocarbon which have not reacted on the NOx occlusion-reduction catalyst, and soft components of hydrocarbon are purified with the oxidation catalyst. In addition, after the temperature rises, hydrocarbon released from the HC-adsorbing member is purified with the oxidation catalyst.

However, the amount of HC adsorbed may be not so much in some cases even when the temperature of the HC-adsorbing member is low, and HC cannot necessarily be adsorbed sufficiently by the HC-adsorbing member. Accordingly, there has been a problem that the outflow of HC to the downstream side of the exhaust gas purification apparatus cannot be prevented sufficiently. Moreover, the inventors of the present invention have found through a lot of experiments that the HC adsorbing capacity of the HC-adsorbing member has a relationship not simply with the temperature of the HC adsorbing agent, but also with the oxygen concentration in the gas containing HC.

SUMMARY OF THE INVENTION

The present invention has been made in view of, the above-described circumstances, and an object of the present invention is to provide an exhaust gas purification method and an exhaust gas purification system with which the outflow of HC to the atmosphere during exhaust gas air-fuel ratio rich control for restoring the NOx occlusion capacity of a NOx occlusion-reduction catalyst can be improved in a case where NOx in exhaust gas is purified by using the NOx occlusion-reduction catalyst and one of a catalyzed DPF and an oxidation catalyst.

In order to achieve the above-described object, provided is an exhaust gas purification method using an exhaust gas purification apparatus in which a NOx occlusion-reduction catalyst for purifying NOx in exhaust gas, an HC-adsorbing member for adsorbing hydrocarbon in the exhaust gas, and one of a catalyzed DPF and an oxidation catalyst for purifying PM in the exhaust gas are disposed in this order from an upstream side of an exhaust passage of an internal combustion engine, the method is characterized by including: during NOx regeneration control for restoring NOx occlusion capacity of the NOx occlusion-reduction catalyst, performing such control that when an index temperature indicative of a temperature of the HC-adsorbing member is not higher than a first judgment temperature, an air-fuel ratio of the exhaust gas is set at 0.8 to 1.1 in terms of excess air factor, when the index temperature is between the first judgment temperature and a second judgment temperature, the air-fuel ratio of the exhaust gas is set at 1.0 to 1.1 in terms of excess air factor, and when the index temperature is higher than the second judgment temperature, the air-fuel ratio of the exhaust gas is set at 0.8 to 1.1 in terms of excess air factor.

If the temperature of the HC-adsorbing member can be directly measured, the directly measured temperature is used as the index temperature indicative of the temperature of the HC-adsorbing member. However, the direct measurement of the temperature of the HC-adsorbing member is difficult, in general. For this reason, instead of this direct temperature, a temperature of the exhaust gas on the upstream side may be used, or a temperature of the exhaust gas on the downstream side may be used. Alternatively, an average temperature of these may be used. The first judgment temperature is a maximum temperature at which the HC-adsorbing member can adsorb HC. The second judgment temperature is a HC light-off temperature of the one of the catalyzed DPF and the oxidation catalyst, i.e., a temperature at which slipped HC starts to be purified on the catalyzed DPF or the oxidation catalyst.

In addition, in the exhaust gas purification method described above, a temperature at which the temperature of the HC-adsorbing member becomes 250° C. is employed as the first judgment temperature, and a temperature at which the temperature of the HC-adsorbing member becomes 300° C. is employed as the second judgment temperature.

According to the exhaust gas purification method, HC is supplied as a reducing agent by post injection or exhaust pipe fuel injection during air-fuel ratio rich control for restoring the NOx occlusion capacity of the NOx occlusion-reduction catalyst, whereby the exhaust gas is brought into an air-fuel ratio rich state. A part of the HC is used to reduce $NO_2$ (nitrogen dioxide) released from the NOx occlusion-reduction catalyst. The rest of the HC outflows to the downstream side of the NOx occlusion-reduction catalyst. However, the HC is adsorbed to the HC-adsorbing member by setting the air-fuel ratio of the exhaust gas at 0.8 to 1.1 in terms of excess air factor when the index temperature indicative of the temperature of the HC-adsorbing member is not higher than the first judgment temperature. This reduces the outflow amount of HC to the downstream side of the exhaust gas purification system.

Specifically, the operation range of an internal combustion engine within which the HC-adsorbing member functions is a range where the air fuel ratio is 0.8 to 1.1 in terms of excess air factor and the temperature is not higher than the first judgment temperature. Accordingly, the catalyst temperature of the HC-adsorbing member is monitored, and when the catalyst temperature is not higher than the first judgment temperature, the air-fuel ratio is set at 0.8 to 1.1 in terms of excess air factor, and thus the HC is adsorbed to the HC-adsorbing member.

In a range where the index temperature is between the first judgment temperature and the second judgment temperature, HC starts to be released from the HC-adsorbing member, and the HC activity of the catalyst supported on the catalyzed DPF or the oxidation catalyst is low. Accordingly, the air-fuel ratio is made slightly rich, i.e., is set at 1.0 to 1.1 in terms of excess air factor, and thus the amount of oxygen is increased. This suppresses the occurrence of the HC slip, and improves the HC activity of the catalyst. Moreover, when the index temperature is not lower than the second judgment temperature, almost all of the HC adsorbed to the HC-adsorbing member desorbs therefrom before the raise of the temperature has been completed, and almost none of the HC outflows from the HC-adsorbing member. In addition, because of the high temperature, the HC activity of the catalyst is high. As a result, the HC slip can be suppressed. For this reason, by setting the air-fuel ratio of the exhaust gas at 0.8 to 1.1 in terms of excess air factor, the NOx occlusion capacity of the NOx occlusion-reduction catalyst is restored efficiently.

Note that, the adsorbed HC desorbs, when the temperature of the HC-adsorbing member becomes not lower than the first judgment temperature after the temperature of the HC-adsorbing member rises as a result of lean operation, acceleration, or the like. However, since the air-fuel ratio of the exhaust gas is in a lean state, the air-fuel ratio is not lower than 1.1 in terms of excess air factor. As a result, the desorbed HC is oxidized on the catalyzed DPF or the oxidation catalyst located in a later stage (on the downstream side). For this reason, the outflow state of HC to the downstream side of the exhaust gas purification system is not deteriorated.

The lower limit of the temperature not higher than the first judgment temperature is a lowest temperature of exhaust gas of an internal combustion engine, and may be a temperature not lower than external temperature. However, the lower limit varies among internal combustion engines. If a certain value is specified, the temperature is, for example, approximately 100° C. Meanwhile, the upper limit of the temperature not lower than the second judgment temperature is a highest temperature of exhaust gas of an internal combustion engine, and may be a temperature at which no thermal degradation and no damage occurs in the NOx occlusion-reduction catalyst, the HC-adsorbing member, and the DPF, in general. If a certain value is specified, the temperature is, for example, approximately 800° C.

In order to achieve the above-described object, provided is an exhaust gas purification system including a NOx occlusion-reduction catalyst for purifying NOx in exhaust gas, an HC-adsorbing member for adsorbing hydrocarbon in the exhaust gas, and one of a catalyzed DPF and an oxidation catalyst for purifying PM in the exhaust gas, in this order from an upstream side of an exhaust passage of an internal combustion engine, the system being characterized by including: an exhaust gas purification control unit for performing, during NOx regeneration control for restoring NOx occlusion capacity of the NOx occlusion-reduction catalyst, such control that when an index temperature indicative of a temperature of the HC-adsorbing member is not higher than a first judgment temperature, an air-fuel ratio of the exhaust gas is set at 0.8 to 1.1 in terms of excess air factor, when the index temperature is between the first judgment temperature and a second judgment temperature, the air-fuel ratio of the exhaust gas is set at 1.0 to 1.1 in terms of excess air factor, and when the index temperature is higher than the second judgment temperature, the air-fuel ratio of the exhaust gas is set at 0.8 to 1.1 in terms of excess air factor.

In addition, in the exhaust gas purification system described above, a temperature at which the temperature of the HC-adsorbing member becomes 250° C. is employed as the first judgment temperature, and a temperature at which the temperature of the HC-adsorbing member becomes 300° C. is employed as the second judgment temperature.

The exhaust gas purification system configured as above allows the above-described exhaust gas purification method to be implemented and similar effects to be achieved.

The control method of the exhaust gas purification system and the exhaust gas purification system according to the present invention makes it possible to greatly improve the outflow of HC to the atmosphere because of the following reasons. Specifically, the HC-adsorbing member is disposed between the NOx occlusion-reduction catalyst and the one of the catalyzed DPF and the oxidation catalyst in the exhaust gas purification system including the NOx occlusion-reduction catalyst and one of the catalyzed DPF and the oxidation catalyst, and functions of the HC-adsorbing member are selectively used by changing the air-fuel ratio in the exhaust gas air-fuel ratio control depending on the temperature of the HC-adsorbing member during the rich air-fuel ratio control for regenerating the NOx occlusion capacity of the NOx occlusion-reduction catalyst.

DESCRIPTION OF THE EMBODIMENTS

Hereinafter, description will be given of an exhaust gas purification method and an exhaust gas purification system of embodiments according to the present invention with reference to the drawings, while an exhaust gas purification system for purifying NOx and PM in an exhaust gas passing through an exhaust passage of a diesel engine is taken as an example. Note that, although a catalyzed DPF is used in the example shown here, the present invention can be applied to a case where an oxidation catalyst is used instead of the catalyzed DPF.

Figure 1:
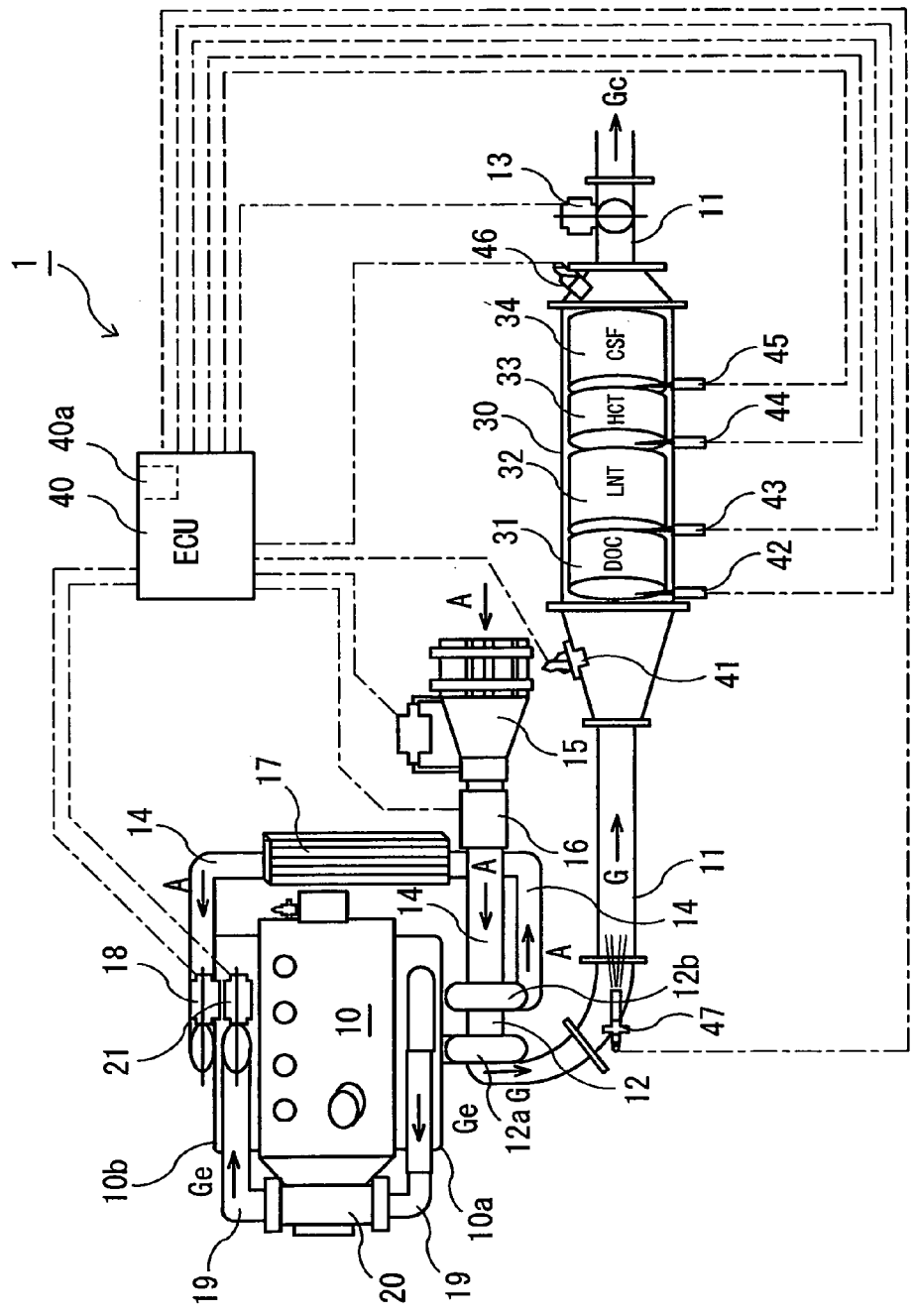
FIG. 1 is view schematically showing a structure of an exhaust gas purification system of an embodiment according to the present invention.

FIG. 1 shows a structure of an exhaust gas purification system 1 of an embodiment of the present invention. In the exhaust gas purification system 1, a turbine 12a of a turbocharger 12, an exhaust gas purification apparatus 30, and an exhaust throttle valve 13 are provided on an exhaust passage 11 of a diesel engine (internal combustion engine) 10 from the upstream side. The exhaust gas purification apparatus 30 is constituted by providing an oxidation catalyst (DOC) 31, a NOx occlusion-reduction catalyst (LNT) 32, an HC-adsorbing member (HCT) 33, a catalyzed DPF (CSF) 34 with an oxidation catalyst or a PM oxidation catalyst supported thereon, in this order from the upstream side.

The oxidation catalyst 31 is formed by causing rhodium, cerium oxide, platinum, aluminum oxide, or the like to be supported on a support of a porous ceramic honeycomb structure such as a cordierite honeycomb. When an unburned fuel such as HC (hydrocarbon) or CO (carbon monoxide) exists in exhaust gas, the oxidation catalyst 31 oxidizes the unburned fuel. The temperature of the exhaust gas is raised by the heat generated by the oxidation, and the temperature of the NOx occlusion-reduction catalyst 32 on the downstream side is raised by the exhaust gas whose temperature has been raised.

The NOx occlusion-reduction catalyst 32 is one of catalysts called lean NOx traps (LNT). This catalyst is constituted by providing a porous catalyst coat layer on a support of a honeycomb structure or the like. The honeycomb structure is formed of a porous ceramic such as a cordierite honeycomb. The catalyst coat layer is formed of aluminum oxide (alumina) or the like. A catalytic noble metal such as platinum and a NOx occlusion substance having a NOx occlusion function are supported on the catalyst coat layer. As the NOx occlusion substance, one or a combination of several kinds of alkali metals such as potassium, sodium, lithium, and cesium, alkaline earth metals such as barium and calcium, and rare earths such as lanthanum and yttrium can be used.

The NOx occlusion-reduction catalyst purifies NOx by oxidizing NO (nitrogen monoxide) in oxygen-rich exhaust gas into a nitrate which is then adsorbed on the catalyst. The NOx occlusion-reduction catalyst occludes NOx in a state where the air-fuel ratio of the exhaust gas is lean. Meanwhile, in a state where the air-fuel ratio is rich, the NOx occlusion-reduction catalyst releases the occluded NOx, and reduces the released NOx in a reducing atmosphere. Thus the catalyst reduces the amount of NOx. In other words, the NOx occlusion-reduction catalyst exhibits two functions of the NOx occlusion, and the NOx release and purification, depending on the oxygen concentration in exhaust gas and the like.

The HC-adsorbing member 33 is constructed by coating a ceramic support or a metal support with a zeolite-based or alumina-based porous material. The material having pores such as zeolite has been known to have a function of adsorbing HC species having large molecular diameters, ammonia, and the like into the pores. When the temperature of the HC-adsorbing member is not higher than 250° C., and when the air-fuel ratio is 0.8 to 1.1 in terms of excess air factor, the HC-adsorbing member adsorbs HC. Meanwhile, when the temperature of the HC-adsorbing member exceeds 250° C., the HC-adsorbing member releases the adsorbed HC.

The catalyzed DPF (diesel particulate filter) 34 is formed of a monolithic honeycomb-type wall-flow filter in which channels (cells) of a porous ceramic honeycomb are blocked alternately at inlets and at outlets. The oxidation catalyst and the PM oxidation catalyst are supported on wall surfaces of the porous ceramic and the inside thereof. The oxidation catalyst is formed of platinum, palladium, or the like. The PM oxidation catalyst is formed of an oxidation catalyst of an oxide such as cerium oxide.

Meanwhile, an intake passage 14 is provided with an air filter 15, a mass airflow sensor (MAF sensor) 16, a compressor 12b of the turbocharger 12, an intercooler 17, and an intake throttle valve 18. Moreover, an exhaust gas recirculation ("EGR") passage 19 connecting an exhaust manifold 10a and an intake manifold 10b is provided with an EGR cooler 20 and an EGR valve 21.

The exhaust passage 11 is provided with an air-fuel ratio (A/F) sensor 41 which is located on the upstream side of the exhaust gas purification apparatus 30, and which detects the air-fuel ratio of exhaust gas for controlling the air-fuel ratio of the exhaust gas. In addition, in order to estimate the temperatures of the catalysts 31, 32, and 33, a first temperature sensor 42 is disposed on the upstream side of the oxidation catalyst 31, a second temperature sensor 43 is disposed between the oxidation catalyst 31 and the NOx occlusion-reduction catalyst 32, a third temperature sensor 44 is disposed between the NOx occlusion-reduction catalyst 32 and the HC-adsorbing member 33, a fourth temperature sensor 45 is disposed between the HC-adsorbing member 33 and the catalyzed filter 34. Moreover, a NOx sensor 46 is disposed on the downstream side of the exhaust gas purification apparatus 30.

In addition, for conducting in-exhaust pipe fuel direct injection, a reducing agent-supplying apparatus (in-exhaust pipe fuel injection valve) 47 is provided to the exhaust passage (exhaust pipe) 11 on the upstream side of the exhaust gas purification apparatus 30. The reducing agent supplying apparatus 47 supplies HC to the exhaust passage 11 by direct injection during the air-fuel ratio rich control in the NOx regeneration control for restoring the NOx occlusion capacity of the NOx occlusion-reduction catalyst 32. Note that when HC is supplied by post injection of in-cylinder fuel injection to the exhaust passage 11, the reducing agent supplying apparatus 47 does not necessarily need to be provided.

In the engine 10, air A is purified through the air filter 15, then, measured for the mass flow rate with the mass air flow sensor (MAF sensor) 16, and pressurized with a compressor 10b. Thereafter, the air A is cooled with the intercooler 17, passes through the intake throttle valve 18, and enters the intake manifold 10b. The intake throttle valve 18 adjusts the flow rate of the air A. Fuel is injected into the air A in a cylinder of the engine 10, and thereby the fuel is combusted. Exhaust gas G generated by the combustion passes through the exhaust manifold 10a, drives a turbine 10a on the exhaust passage (exhaust gas passage) 11, and then passes through the exhaust gas purification apparatus 30, to thereby be a purified exhaust gas Gc. Thereafter, the purified exhaust gas Gc passes through the exhaust throttle valve 13 and through an unillustrated muffler (sound absorber), and then emitted to the atmosphere. In addition, a part of the exhaust gas G is cooled with the EGR cooler 20 on the EGR passage 19, then passes through the EGR valve 21, enters the intake manifold 10b, is mixed with the air A as an EGR gas Ge, and enters the cylinder. The EGR valve 21 adjusts the flow rate of the EGR gas Ge.

In addition, an exhaust gas purification control unit 40a is provided for controlling the exhaust gas purification system 1. Generally, the exhaust gas purification apparatus 40a is constructed in a state of being included in an engine control unit (ECU) 40 which controls the entire engine. The exhaust gas purification control unit 40a receives inputs of an engine revolution number, a fuel injection amount (or load), and the like, in addition to inputs from the air-fuel ratio sensor 41, the first to fourth temperature sensors 42, 43, 44, and 45, the NOx sensor 46, and the like. In addition, the exhaust gas purification control unit 40a has a close relationship with the engine control unit 40, and causes the engine control unit 40 to control the in-cylinder fuel injection, the exhaust throttle valve 13, the intake throttle valve 18, the EGR valve 21, the reducing agent supplying apparatus 47, and the like.

Figure 2:
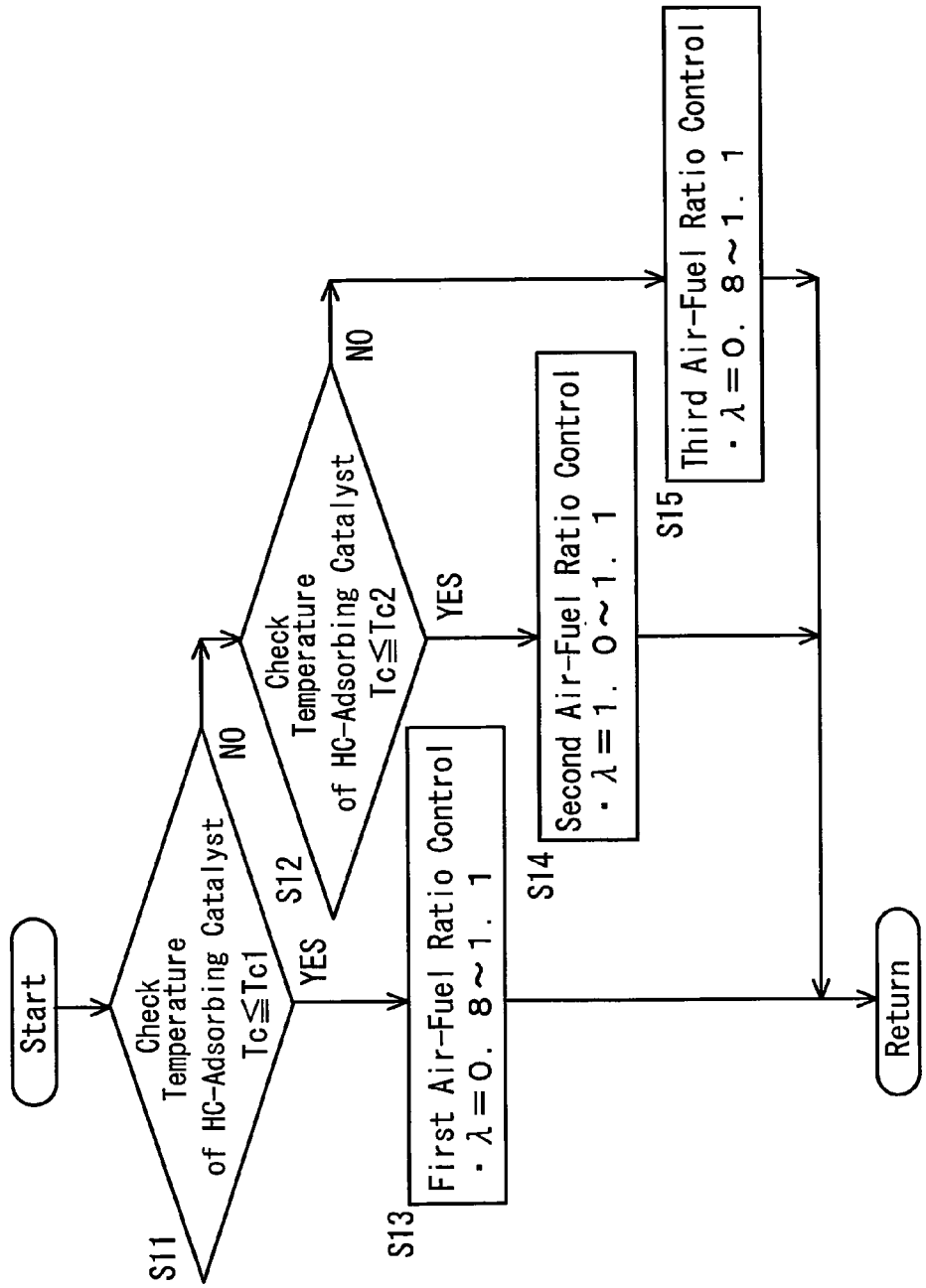
FIG. 2 is a diagram showing an example of a control flow of an exhaust gas purification method according to the present invention.

Next, an exhaust gas purification method for the exhaust gas purification system 1 will be described. The exhaust gas purification method is conducted in accordance with a control flow exemplified in FIG. 2. Along with the start of the engine, the control flow of FIG. 2 is called in a higher control flow for performing NOx regeneration control for restoring the NOx occlusion capacity of the NOx occlusion-reduction catalyst, and starts to be executed. The higher control flow is a main control flow for performing the general control of the engine, or the like. Meanwhile, when the termination of operation of the engine, such as the turning off of an engine key, is detected, the process is interrupted, and returns to the higher control flow. Then the control flow is terminated along with the termination of the main control flow.

When the NOx regeneration control is started, the control flow of FIG. 2 is called in the higher control flow, and started. When the control flow of FIG. 2 is started, first, it is determined in Step S11 whether or not an index temperature Tc indicative of the temperature of the HC-adsorbing member 33 is not higher than a predetermined first judgment temperature Tc1. Since the direct measurement of the temperature of the HC-adsorbing member 33 is difficult, a temperature detected with the third temperature sensor 44 on the upstream side or a temperature detected with the fourth temperature sensor 45 on the downstream side is used as the index temperature Tc instead of the directly measured temperature of the HC-adsorbing member 33. Alternatively, an average of these temperatures may be used. As this first judgment temperature Tc1, a temperature at which the temperature of the HC-adsorbing member 33 becomes 250° C. is employed. As the second judgment temperature Tc2, a temperature at which the temperature of the HC-adsorbing member 33 becomes 300° C. is employed.

If the determination in Step S11 is that the index temperature Tc is higher than the predetermined first judgment temperature Tc1 (NO), the process goes to Step S12 where it is determined whether or not the index temperature Tc is not higher than a predetermined second judgment temperature Tc2. If the determination in Step S11 is that the index temperature Tc is not higher than the predetermined first judgment temperature Tc1 (YES), the process goes to first air-fuel ratio control of Step S13 where a reducing agent such as HC (fuel) is supplied from the reducing agent supplying apparatus 47, while the amount of the reducing agent is adjusted so that the air-fuel ratio can be 0.8 to 1.1 in terms of excess air factor.

If the determination in Step S12 is that the index temperature Tc is not higher than the predetermined second judgment temperature Tc2 (YES), the process goes to second air-fuel ratio control of Step S14 where a reducing agent such as HC (fuel) is supplied from the reducing agent supplying apparatus 47 while the amount of the reducing agents is adjusted so that the air-fuel ratio can be 1.0 to 1.1 in terms of excess air factor. If the determination in Step S12 is that the index temperature Tc is higher than the predetermined second judgment temperature Tc2 (NO), the process goes to third air-fuel ratio control of Step S15 where a reducing agent such as HC (fuel) is supplied from the reducing agent supplying apparatus 47 while the amount of the reducing agents is adjusted so that the air-fuel ratio can be 0.8 to 1.1 in terms of excess air factor.

Then, each of the Steps S13, 14, and 15 is conducted for its corresponding predetermined time (a time associated with intervals of checking of the index temperature Tc). Thereafter, the process returns to the higher control flow. After returning to the higher control flow, if the NOx regeneration control is being conducted, the control flow of FIG. 2 is repeatedly executed. As described above, the control flow of FIG. 2 repeatedly executes one of the sets of Steps S11 to S13, Steps S11 to S14, and Steps S11 to S15 until the NOx regeneration control is terminated.

This control allows the following control to be conducted for the exhaust gas purification system 1 including the NOx occlusion-reduction catalyst 32 for purifying NOx in exhaust gas, the HC-adsorbing member 33 for adsorbing hydrocarbons in the exhaust gas, and the catalyzed DPF 34 for purifying PM in the exhaust gas, in this order from the upstream side of the exhaust passage 11 of the engine (internal combustion engine) 10. Specifically, during NOx regeneration control for restoring the NOx occlusion capacity of the NOx occlusion-reduction catalyst 32, this control is conducted such that when the index temperature Tc of the HC-adsorbing member 33 is not higher than the first judgment temperature Tc1, the air-fuel ratio of the exhaust gas is set at 0.8 to 1.1 in terms of excess air factor, when the index temperature Tc of the HC-adsorbing member 33 is between the first judgment temperature Tc1 and the second judgment temperature Tc2, the air-fuel ratio of the exhaust gas is set at 1.0 to 1.1 in terms of excess air factor, and when the index temperature Tc of the HC-adsorbing member 33 is not lower than the second judgment temperature Tc2, the air-fuel ratio of the exhaust gas is set at 0.8 to 1.1 in terms of excess air factor.

According to the exhaust gas purification method in accordance with the control flow of FIG. 2, HC is supplied as a reducing agent by exhaust pipe fuel injection during the air-fuel ratio rich control for restoring the NOx occlusion capacity of the NOx occlusion-reduction catalyst 32, whereby the exhaust gas is brought into a rich state. A part of the HC is used to reduce $NO_2$ released from the NOx occlusion-reduction catalyst 32. The rest of the HC outflows to the downstream side of the NOx occlusion-reduction catalyst 32. When the index temperature Tc indicative of the temperature of the HC-adsorbing member 33 is not higher than the first judgment temperature Tc1, however, the air-fuel ratio of the exhaust gas is set at 0.8 to 1.1 in terms of excess air factor. This causes the HC-adsorbing member 33 to adsorb HC, so that the outflow amount of HC to the downstream side of the exhaust gas purification apparatus 30 is reduced.

Specifically, the operation range of the engine 10 within which the HC-adsorbing member 33 functions is a range where the air fuel ratio is 0.8 to 1.1 in terms of excess air factor and the temperature is not higher than the first judgment temperature Tc1. Accordingly, the index temperature Tc indicative of the temperature of the HC-adsorbing member 33 is monitored, and when the index temperature Tc is not higher than the first judgment temperature Tc1, the air-fuel ratio is set at 0.8 to 1.1 in terms of excess air factor, and the HC is adsorbed to the HC-adsorbing member 33.

In a range where the index temperature Tc is between the first judgment temperature Tc1 and the second judgment temperature Tc2, HC starts to be released from the HC-adsorbing member 33, and the HC activity of the catalyst supported on the catalyzed DPF 34 is low. Accordingly, the air-fuel ratio is brought into a slightly rich state, i.e., is set at 1.0 to 1.1 in terms of excess air factor, and thus the amount of oxygen is increased. This suppresses the occurrence of the HC slip, and improves the HC activity of the catalyst. Moreover, when the index temperature Tc is not lower than the second judgment temperature Tc2, almost all of the HC adsorbed to the HC-adsorbing member 33 desorbs from the HC-adsorbing member 33 before the raise of the temperature is completed, and almost none of HC outflows from the HC-adsorbing member 33. In addition, because of the high temperature, the HC activity of the catalyst is high. As a result, the HC slip can be suppressed. For this reason, by setting the air-fuel ratio of the exhaust gas at 0.8 to 1.1 in terms of excess air factor, the NOx occlusion capacity of the NOx occlusion-reduction catalyst 32 is restored efficiently.

Note that the adsorbed HC desorbs when the index temperature Tc of the HC-adsorbing member 33 rises as a result of lean operation, acceleration, or the like. Specifically, the adsorbed HC desorbs when the air-fuel ratio of the exhaust gas is not lower than 1.1 in terms of excess air factor, and when the index temperature Tc of the HC-adsorbing member 33 is not lower than the second judgment temperature Tc2. However, the desorbed HC is oxidized on the catalyzed DPF 34 located in a later stage (on the downstream side). For this reason, the outflow state of HC to the downstream side of the exhaust gas purification apparatus 30 is not deteriorated.

Figure 3:
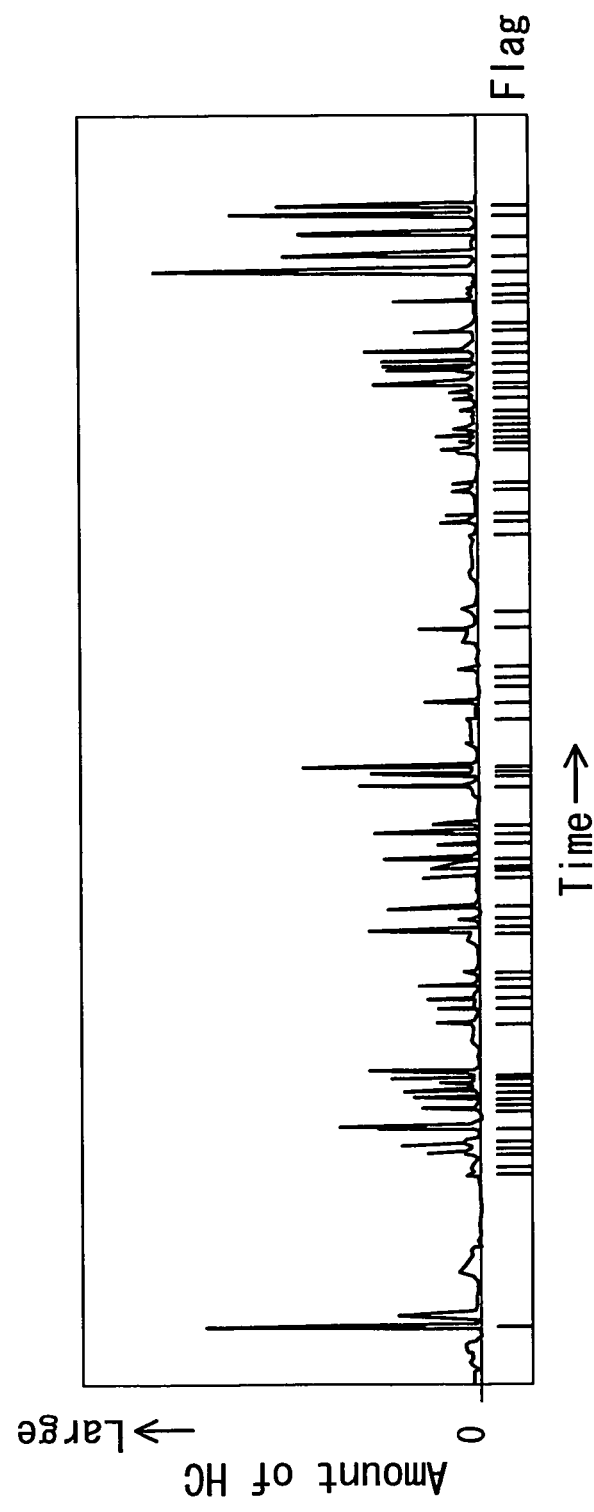
FIG. 3 is a chart showing the outflow amount of HC obtained when control of the exhaust gas purification method according to the present invention was conducted in a running test under the JE05 mode.
Figure 4:
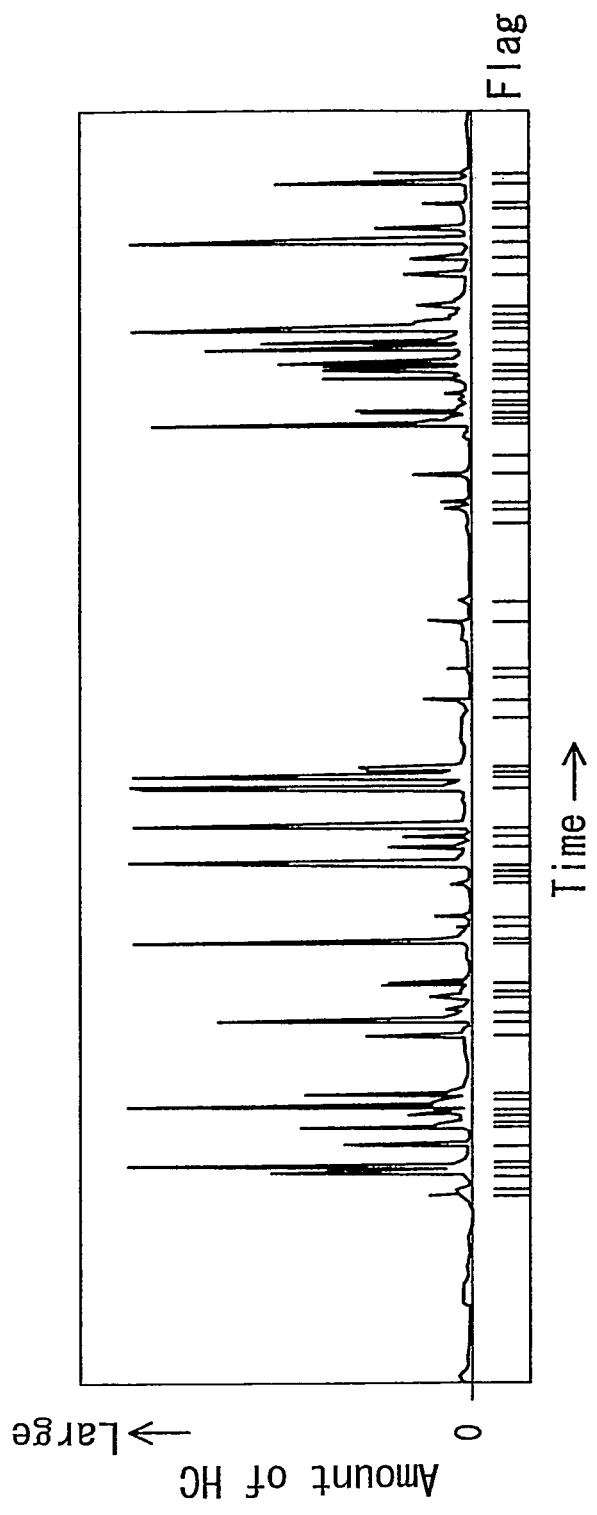
FIG. 4 is a chart showing the outflow amount of HC obtained when control of an exhaust gas purification method of a conventional technique was conducted in a running test under the JE05 mode.

FIGS. 3 and 4 show the results of measurement of the outflow amount of HC to the downstream side of the exhaust gas purification system in a case where the air-fuel ratio control in which the excess air ratio was changed depending on the temperature of the HC-adsorbing member is performed and in a case of control of a conventional technique where the aforementioned control was not conducted. Each of the measured values indicates the outflow amount of HC achieved in the JE05 mode exhaust gas test method which is an engine bench test in a transient operation mode. Each protrusion on the lower side indicates a flag of regeneration control. When the flag is on, the air-fuel ratio rich control for the NOx regeneration is being performed. From the graph of Example in FIG. 3, it can be seen that the outflow amount of HC is significantly decreased when compared with that of Conventional Example in FIG. 4.

Accordingly, the aforementioned exhaust gas purification method and exhaust gas purification system 1 makes it possible to improve greatly the outflow of HC to the atmosphere because of the following reasons. Specifically, the HC-adsorbing member 33 is disposed between the NOx occlusion-reduction catalyst 32 and the catalyzed DPF 34 in the exhaust gas purification system 1 including the NOx occlusion-reduction catalyst 32 and the catalyzed DPF 34, and the functions of the HC-adsorbing member 33 are selectively used by changing the air-fuel ratio in the exhaust gas air-fuel ratio control depending on the temperature of the HC-adsorbing member 33 during the air-fuel ratio rich control for regenerating the NOx occlusion capacity of the NOx occlusion-reduction catalyst 32.

Specifically, a part of the reducing agent supplied in the NOx regeneration control is used to reduce $NO_2$ released from the NOx occlusion material of the NOx occlusion-reduction catalyst 32. The rest of the reducing agent outflows to the downstream side of the NOx occlusion-reduction catalyst 32, and hence is adsorbed to the HC-adsorbing member 33. The operation range within which the adsorbing function is exhibited is a range where the air fuel ratio is 0.8 to 1.1 in terms of excess air factor and the temperature of the HC-adsorbing member 33 is not higher than the HC trap temperature (250° C.). Accordingly, by monitoring the temperature of the HC-adsorbing member 33, and by performing at or below 250° C. a rich reduction with the air-fuel ratio being 0.8 to 1.1 in terms of excess air factor, the HC which would otherwise outflow to the downstream side of the NOx occlusion-reduction catalyst 32 is effectively adsorbed to the HC-adsorbing member 33, and the increase in the outflow amount of HC is suppressed.

Thereafter, the adsorbed HC desorbs when the temperature of the HC-adsorbing member 33 becomes higher than 250° C. as a result of acceleration or the like. Since the desorbed HC is made to be easily oxidized in the catalyzed DPF on the downstream side in a slightly rich state of 1.0 to 1.1 in terms of excess air factor, the outflow amount of HC is not deteriorated. In addition, when the temperature of the HC-adsorbing member 33 becomes higher than 250° C. after the air-fuel ratio rich control is terminated, the desorbed HC is oxidized in the catalyzed DPF on the downstream side in a lean state where the air-fuel ratio is not lower than 1.1 in terms of excess air factor because normal operation is conducted in a state where the air-fuel ratio is lean. Hence, the outflow amount of HC is not deteriorated.

The above-described exhaust gas purification method and exhaust gas purification system of the present invention having excellent effects is provided to an internal combustion engine or the like mounted on a vehicle, and can be used extremely effectively for an exhaust gas purification system including a NOx occlusion-reduction catalyst for purifying NOx in exhaust gas, an HC-adsorbing member for adsorbing hydrocarbon in the exhaust gas, and one of a catalyzed DPF and an oxidation catalyst for purifying PM in the exhaust gas, in this order from the upstream side of an exhaust passage of the internal combustion engine.

What is claimed is:
1. An exhaust gas purification system comprising:
a NOx occlusion-reduction catalyst for purifying NOx in exhaust gas, a hydrocarbon-adsorbing member for only adsorbing hydrocarbons in the exhaust gas, and one of a catalyzed diesel particulate filter or an oxidation catalyst for purifying particulate matter in the exhaust gas, in this order from an upstream side of an exhaust passage of an internal combustion engine; and
a controller configured, during NOx regeneration control for restoring NOx occlusion capacity of the NOx occlusion-reduction catalyst, to
when an index temperature indicative of a temperature of the hydrocarbon-adsorbing member is not higher than a first judgment temperature, perform a first air-fuel ratio control by controlling an air-fuel ratio of the exhaust gas to be set at 0.8 to 1.1 in terms of excess air factor, when the index temperature is between the first judgment temperature and a second judgment temperature, supply reducing agent to the exhaust gas passage, by post infection of the internal combustion engine or by direct injection of a reducing agent supplying apparatus provided in the exhaust passage, to perform a second air-fuel ratio control by controlling the air-fuel ratio of the exhaust gas to be set at 1.0 to 1.1 in terms of excess air factor, and when the index temperature is higher than the second judgment temperature, perform a third air-fuel ratio by controlling the air-fuel ratio of the exhaust gas to be set at 0.8 to 1.1 in terms of excess air factor.

2. The system according to claim 1, wherein the controller is configured to make the air fuel ratio rich when the index temperature is not higher than the first judgment temperature; and the controller is configured to make the air-fuel ratio rich when the index temperature is higher than the second judgment temperature.

3. An exhaust gas purification method, comprising:

using an exhaust gas purification apparatus in which a NOx occlusion-reduction catalyst for purifying NOx in exhaust gas, a hydrocarbon-adsorbing member for only adsorbing hydrocarbons in the exhaust gas, and one of a catalyzed diesel particulate filter or an oxidation catalyst for purifying particulate matter in the exhaust gas are disposed in this order from an upstream side of an exhaust passage of an internal combustion engine, and a controller, the method including utilizing the controller, during NOx regeneration control for restoring NOx occlusion capacity of the NOx occlusion-reduction catalyst, to perform the following steps:

when an index temperature indicative of a temperature of the hydrocarbon-adsorbing member is not higher than a first judgment temperature, performing a first air-fuel ratio control by controlling an air-fuel ratio of the exhaust gas to be set at 0.8 to 1.1 in terms of excess air factor, when the index temperature is between the first judgment temperature and a second judgment temperature, supplying reducing agent to the exhaust passage, by post injection of the internal combustion engine or by direct injection via a reducing agent supplying apparatus provided in the exhaust passage, to perform a second air-fuel ratio control by controlling the air-fuel ratio of the exhaust gas to be set at 1.0 to 1.1 in terms of excess air factor, and when the index temperature is higher than the second judgment temperature, performing a third air-fuel ratio control by controlling the air-fuel ratio of the exhaust gas to be set at 0.8 to 1.1 in terms of excess air factor.

4. The method according to claim 3, further comprising:

when the index temperature is not higher than the first judgment temperature, making the air-fuel ratio rich; and when the index temperature is higher than the second judgment temperature, making the air-fuel ratio of the exhaust gas rich.

* * * * *